(12) United States Patent
Suzuki et al.

(10) Patent No.: US 10,511,237 B2
(45) Date of Patent: Dec. 17, 2019

(54) METHOD OF DRIVING A DRIVING APPARATUS

(71) Applicant: TDK Corporation, Minato-ku, Tokyo (JP)

(72) Inventors: Akira Suzuki, Tokyo (JP); Masaru Uno, Tokyo (JP); Kazutomo Imi, Tokyo (JP); Yoshiaki Haga, Tokyo (JP)

(73) Assignee: TDK CORPORATION, Tokyo (JP)

( * ) Notice: Subject to any disclaimer, the term of this patent is extended or adjusted under 35 U.S.C. 154(b) by 409 days.

(21) Appl. No.: 15/435,040

(22) Filed: Feb. 16, 2017

(65) Prior Publication Data

US 2017/0163177 A1 Jun. 8, 2017

Related U.S. Application Data

(62) Division of application No. 14/032,061, filed on Sep. 19, 2013, now abandoned.

(30) Foreign Application Priority Data

Sep. 21, 2012 (JP) .................................. 2012-208675

(51) Int. Cl.
*H02N 2/06* (2006.01)
*H02N 2/02* (2006.01)
*B06B 1/06* (2006.01)

(52) U.S. Cl.
CPC .............. *H02N 2/06* (2013.01); *B06B 1/0644* (2013.01); *H02N 2/025* (2013.01); *H02N 2/062* (2013.01)

(58) Field of Classification Search
CPC ........... H02N 2/06; H02N 2/062; H02N 2/025

USPC .......................................................... 310/317
See application file for complete search history.

(56) References Cited

U.S. PATENT DOCUMENTS

| 6,155,500 A | 12/2000 | Takase |
| 2001/0026112 A1 | 10/2001 | Yoshida et al. |
| 2008/0203950 A1* | 8/2008 | Yoshida ................. H02N 2/067 318/116 |

(Continued)

FOREIGN PATENT DOCUMENTS

| JP | H07-170763 A | 7/1995 |
| JP | 2000-023474 A | 1/2000 |

(Continued)

*Primary Examiner* — Derek J Rosenau
(74) *Attorney, Agent, or Firm* — Arent Fox LLP

(57) ABSTRACT

The present invention provides a driving apparatus capable of suppressing the operation noise. A driving apparatus comprises a piezoelectric element expanding and contracting in accordance with a driving signal; a supporting shaft connected to said piezoelectric element; a movable body frictionally engaged with said supporting shaft and capable of moving along said supporting shaft; and a driving portion applying said driving signal including a first driving signal which moves said movable body towards a first direction to said piezoelectric element, wherein said driving portion can repeatedly apply said first driving signal against said piezoelectric element by taking a first time in between, and said first driving signal comprises a main driving waveform group which moves said movable body to said first direction, and a sub driving waveform group which is placed after said main driving waveform group by having a second rest time shorter than said first time in between.

13 Claims, 10 Drawing Sheets

(56) References Cited

U.S. PATENT DOCUMENTS

2009/0085433 A1    4/2009  Yoshimura

FOREIGN PATENT DOCUMENTS

| JP | 2004-056951 A | 2/2004 |
| JP | 2009-089517 A | 4/2009 |
| JP | 2009-296760 A | 12/2009 |
| JP | 2010-259223 A | 11/2010 |

* cited by examiner

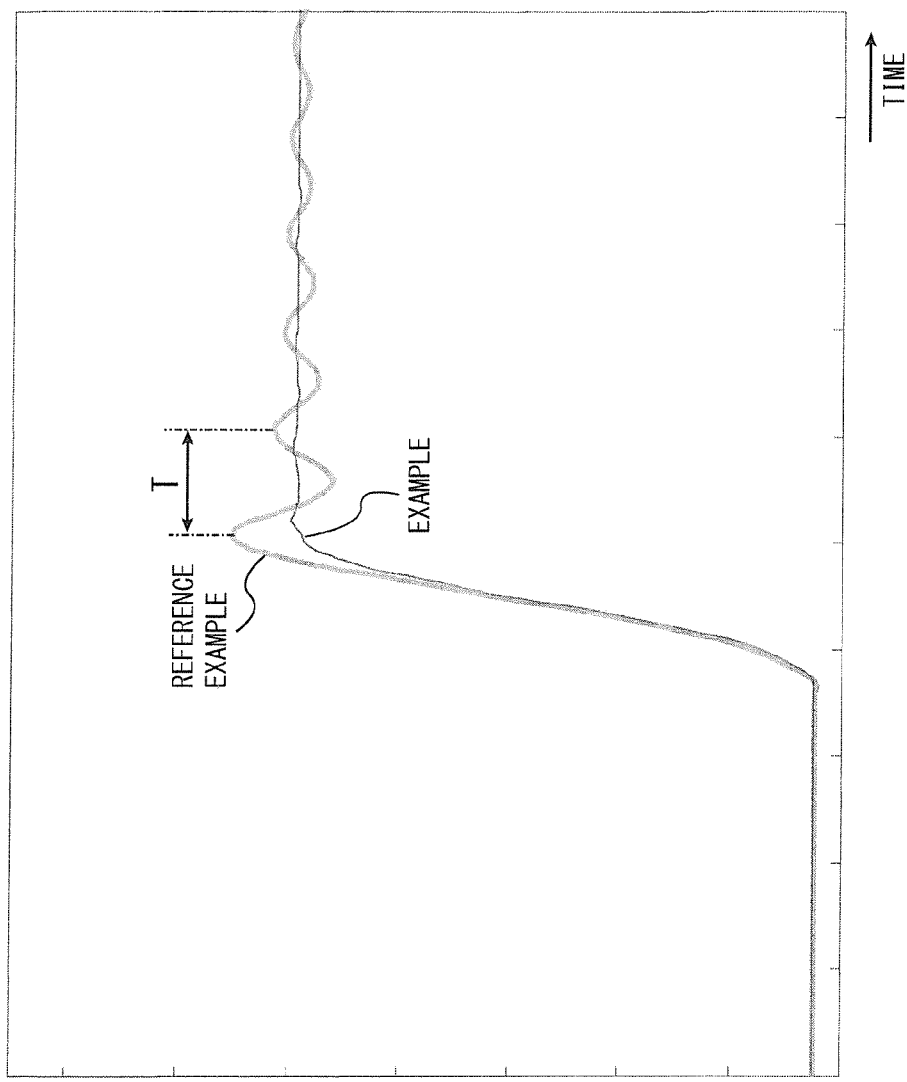

METHOD OF DRIVING A DRIVING APPARATUS

CROSS-REFERENCE TO RELATED APPLICATIONS

This application is a Divisional of U.S. patent application Ser. No. 14/032,061, filed Sep. 19, 2013, which claims priority to Japanese Patent Application No. 2012-208675, filed Sep. 21, 2012. The disclosures of the priority applications are incorporated in their entirety herein by reference.

BACKGROUND OF THE INVENTION

Field of the Invention

The present invention relates to a driving apparatus that applies a driving signal to a piezoelectric element to move a movable body.

Background Art

The mechanical displacement obtained by the piezoelectric element is relatively minute. Therefore, a driving apparatus using the piezoelectric element is preferably used as actuators which require accuracy and also precise control. As an example of applying the driving apparatus which uses the piezoelectric element, for instance, a driving apparatus which moves an optical system included in an imaging device and the like are exemplified.

However, for the imaging device applying the driving apparatus like the above, operating noises are generated when driving, and that sometimes causes a problem. As for the conventional technology to reduce the operating noise generated by the driving apparatus, the technology to keep applying the driving signal to the movable body even when it is stopped, or the technology that changes the driving waveform in accordance with the speed of the movable body or so is proposed (Patent document 1 and Patent document 2).

[Patent document 1] JP-A-No. 2010-259223
[Patent document 2] JP-A-No. 2009-296760

SUMMARY OF THE INVENTION

In the conventional technology to reduce the operating noise, it was necessary that the driving circuit can apply various driving waveform against the piezoelectric element, thus the driving circuit or the control become complicated, and also there was a problem that it tool time for designing. Further, in the conventional technology, in some case, the operating noise could not necessarily be suppressed.

The present invention was achieved in view of such circumstances, and its object is to provide the driving apparatus capable to suppressing the operating noise.

In order to achieve the above mentioned object, the driving apparatus according to the present invention comprises;
- a piezoelectric element expanding and contracting in accordance with a driving signal;
- a supporting shaft connected to said piezoelectric element;
- a movable body frictionally engaged with said supporting shaft and capable of moving along said supporting shaft; and
- a driving portion applying said driving signal including a first driving signal which moves said movable body towards a first direction to said piezoelectric element, wherein
- said driving portion can repeatedly apply said first driving signal against said piezoelectric element by taking a first time in between, and
- said first driving signal comprises a main driving waveform group which moves said movable body to said first direction, and a sub driving waveform group which is placed after said main driving waveform group by having the a second rest time shorter than said first time in between.

As a result of keen examination regarding the technology to reduce the operating noise generated in the driving apparatus by the present inventors of the present invention, it was found that the one of the cause of the operating noise was by the phenomena of which the movable body itself vibrating due to the inertia force generated when the movable body is stopped. Particularly, in case of moving the movably body intermittently by taking predetermined time (the first time) in between, such operating noise is generated repeatedly, thus the user of the apparatus tends to sense the operating noise easier.

In the present invention, the first driving signal applied to the piezoelectric element by the driving portion comprises a sub driving waveform group placed after a second rest time in between a main driving waveform group. That is, the driving portion applies the sub driving waveform group taking the second rest time in between after the main waveform group which moves the movable body to the first direction is applied, thereby the vibration caused to the movable body when stopped is suppressed, and enables to effectively reduce the operating noise caused by the vibration of the movable body.

Also, said movable body is formed at one end portion of a second direction which intercept approximately perpendicular in said first direction, and may comprise an engagement portion frictionally engaging with said supporting shaft, and
- said movable body may have a one end support structure supported by said supporting shaft via said engagement portion.

The structure of the movable body is not particularly limited; however in case the movable body is a one end support structure against the supporting shaft, the driving apparatus having low operating noise while having simple structure.

Also, for example, said sub driving waveform group may include a waveform which moves said movable body to said first direction, and when the vibrating period caused to said movable body is T when said movable body is stopped, then said second rest time may be shorter than T/4.

The time of applying the sub driving waveform is not particularly limited as long as it is at the time which reduces the vibration or the operating noise of the movable body; however by applying the sub driving waveform group which moves the movable body to the first direction between the time range of after the application of the main driving waveform group applying is completed till T/4; the force vibrating the movable body is effectively released, thus the vibration caused to the movable body and the operation noise accompanied therewith can be effectively suppressed.

Also, for example, said sub driving waveform group may include a waveform which moves said movable body to the opposite direction of said first direction, and when the vibrating period caused in said movable body is T when said movable body is stopped, then said second rest time may be longer than T/4 and shorter than 3T/4.

As such, even if the sub driving waveform group is applied which moves the movable body to the opposite direction of the first direction, between the time range of after T/4 being completed with the application of the main driving waveform group till 3T/4, as similar to the aforementioned example, the force of vibrating the movable body is effectively released, thus the vibration caused to the movable body and the operation noise accompanied therewith can be effectively suppressed.

Said sub driving waveform group may comprise a first sub driving waveform group placed by taking said second rest time in between said main driving waveform group, and a second sub driving waveform group placed by taking a third rest time shorter than said first time in between said first sub driving waveform group.

Such driving apparatus, by dividing the application of the sub driving waveform group into the first sub driving waveform group and the second driving waveform group, the vibration of the movable body which is accompanied with the stop of the application of the sub driving waveform group itself is prevented; hence the vibration of the movable body and the operation noise accompanied therewith generated after the entire first driving signal is applied can be suppressed further effectively.

Also, for example, said second sub driving waveform group may include a waveform which moves said movable body to the same direction of which said first sub driving waveform group moves the movable body, and when the vibrating period caused in said movable body is T when said movable body is stopped, then the third rest time may be shorter than T/4.

The time of applying the second sub driving waveform group is not particularly limited as long as it is at the time that reduces the vibration or the operation noise of the movable body; however by applying the second sub driving waveform group which moves the movable body to the same direction as the first sub direction waveform between the time range of after the application of the first sub driving waveform group is completed till T/4, the vibration and the operation noise generated accompanied with the stop of the application of the main driving waveform group and the first sub driving waveform group can be effective suppressed.

Also, for example, said second sub driving waveform group may include a waveform which moves said movable body to the opposite direction of which said first sub driving waveform group moves the movable body, and when the vibrating period caused in said movable body is T when said movable body is stopped, then said third rest time is longer than T/4 and shorter than 3T/4.

As such, even if the second sub waveform group is applied which move the movable body to the opposite direction of the first sub driving waveform group between the time range of after T/4 being completed with the application of the first sub driving waveform group till 3T/4, as similar to the aforementioned example, the force of vibrating the movable body is effectively counterbalanced by the force moving the movable body by the sub driving waveform group; thereby the vibration of the movable body and the operation noise accompanying therewith can be suppressed effectively.

BRIEF DESCRIPTION OF DRAWINGS

FIG. 10 is a graph showing the measurement data of the movement of the movable body according to the example and the reference example of the present invention.

DETAILED DESCRIPTION OF THE INVENTION

The First Embodiment

Figure 1:
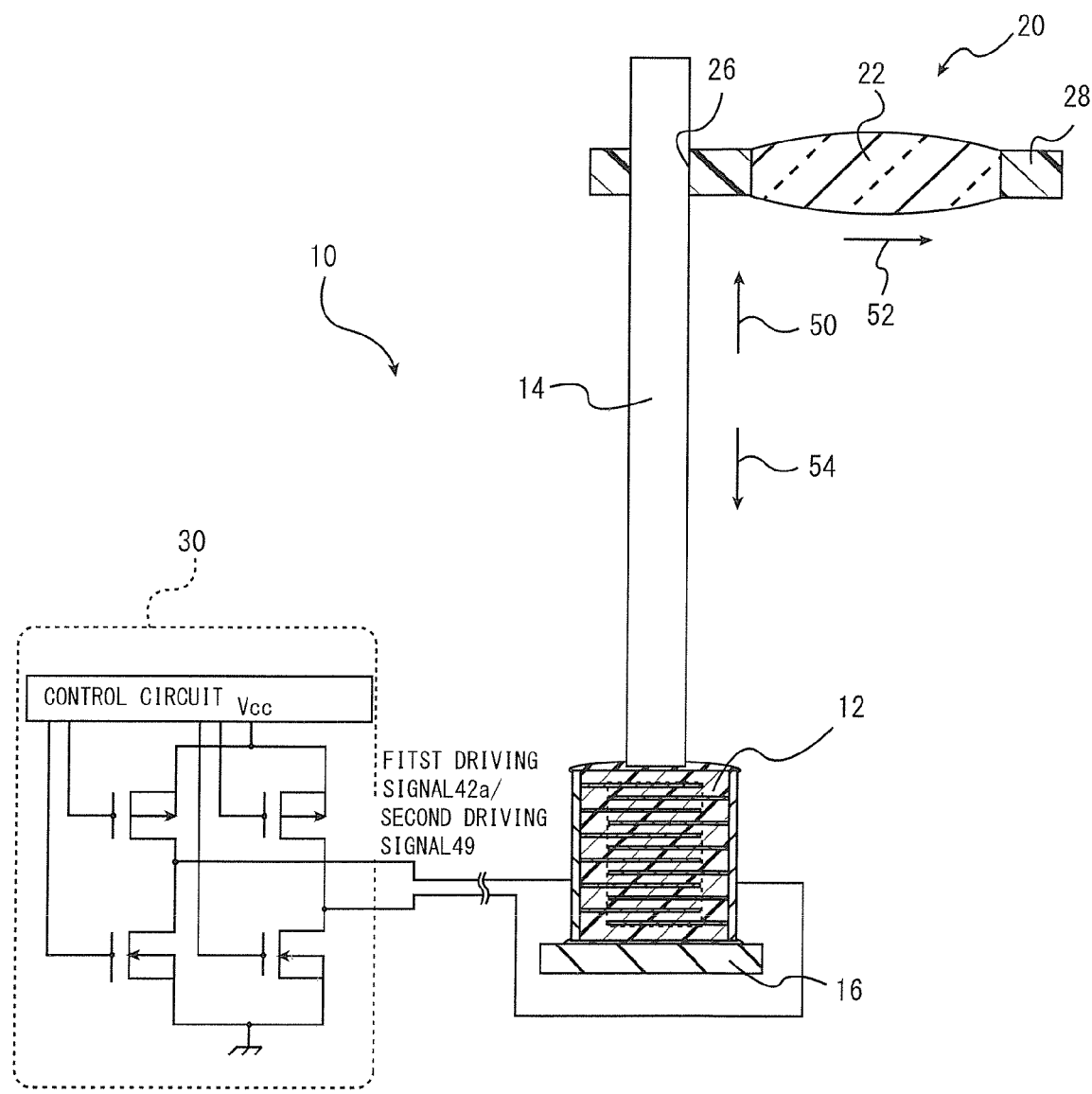
FIG. 1 is a schematic diagram of the driving apparatus according to one embodiment of the present invention.

FIG. 1 is a schematic view of a driving apparatus 10 according to one embodiment of the present invention. The driving apparatus 10 comprises a piezoelectric element 12, a supporting shaft 14, a weight 16, a movable body 20 and a driving portion 30. The driving apparatus 10 comprises the movable body 20 having optical system 22, and is used as a part of mechanism that moves the optical system 22 in an imaging device. However, the use of the driving apparatus 10 according to the present invention is not limited to this.

The piezoelectric element 12 is expanding and contracting in accordance with a driving pulse signal which is applied by the driving portion 30. For the piezoelectric element 12, for instance, a laminated piezoelectric element that materials having piezoelectricity are laminated while alternately sandwiching electrodes having different polarities can be adopted. However, it is not particularly limited thereto.

The supporting shaft 14 is connected to one end of the piezoelectric element 12, and the weight 16 is connected to other end of the piezoelectric element 12. The weight 16 functions as an inertia body to cause a displacement to the supporting shaft 14 in accordance with the expansion and contraction of the piezoelectric element 12. Further, the weight 16 may be connected to other members.

The supporting shaft 14 is displaced in accordance with the expansion and contraction of the piezoelectric element 12. As shown in FIG. 1, the supporting shaft 14 is displaced in the first direction 50 and the third direction 54 of the axial direction of the supporting shaft. However, the supporting shaft 14 is connected to the piezoelectric element 12. Therefore, the supporting shaft 14 reciprocates within the range of the amount of expansion and contraction of the piezoelectric element 12.

The movable body 20 frictionally engages with the supporting shaft 14. The movable body 20 is capable of moving in the first direction 50 and the third direction 54 along the supporting shaft 14. The movable body 20 comprises a holding frame 24 and an optical system 22 which is held by the holding frame 24. The movable body 20 has a substantially discoid shape and the diametrical direction of the movable body 20 is arranged along the second direction which is perpendicular to the first direction of the supporting shaft 14.

At one end of the second direction 52 of the movable body 20, an engagement portion 26 frictionally engaged with the supporting shaft 14 is formed. As shown in FIG. 1, the movable body 20 has a one end support structure, that the movable body is supported with respect to the supporting shaft 14 through the engagement portion 26.

The movable body 20 can be displaced jointly with the supporting shaft 14. However, the movable body 20 also can be displaced beyond the range of the amount of expansion and contraction of the piezoelectric element 12 by relatively moving with respect to the supporting shaft 14. For instance, when the supporting shaft 14 is displaced at low speed, the engagement of the movable body 20 and the supporting shaft 14 is maintained and the movable body 20 is displaced together with the supporting shaft 14. However, when the supporting shaft 14 is displaced at high speed, a sliding displacement is caused between the movable body 20 and the supporting shaft 14, and a relative movement is caused between the movable body 20 and the supporting shaft 14. Therefore, by causing an asymmetric reciprocating motion, which has different speeds towards the first direction and the towards the third direction, of the supporting shaft 14, the driving apparatus 10 enables the movable body 20 frictionally engaged with the supporting shaft 14 to move beyond the range of the amount of expansion and contraction of the piezoelectric element 12.

The driving portion 30 applies the driving signal to the piezoelectric element 12. Further specifically, the driving portion 30 generates the driving signal which changes the voltage value applied in between the electrodes of the piezoelectric element 12 to change the voltage value applied to the piezoelectric element; thereby the amount of the expansion and the contraction of the piezoelectric element and the speed of the expansion and the contraction are controlled. The driving signal generated by the driving portion 30 includes the first driving signal 42a which moves the movable body 20 to the first direction 50, and the second driving signal 49 which moves the movable body 20 to the third direction 54.

In the imaging device provided with the driving apparatus 10, the imaging element is placed (not shown in the figure) of which the light passing through the optical system 22 is guided. The driving apparatus 30 applies the first driving signal 42a and the second driving signal 49 to the piezoelectric element 12; thereby the optical distance between the optical system 22 held by the movable body 20 and the imaging element can be changed.

The driving portion 30 according to the present embodiment can output the first driving signal 42a which is repeatedly applied to the piezoelectric element 12 taking the first time in between, and the second driving signal 49 which is repeatedly applied to the piezoelectric element 12 taking the first time in between. The driving portion 30 outputs the first driving signal 42a and the second driving signal 49 to move the optical system 22; thereby the movement of the optical system 22 which becomes necessary during the auto focus carried out in the imaging device can be accomplished.

Figure 2:
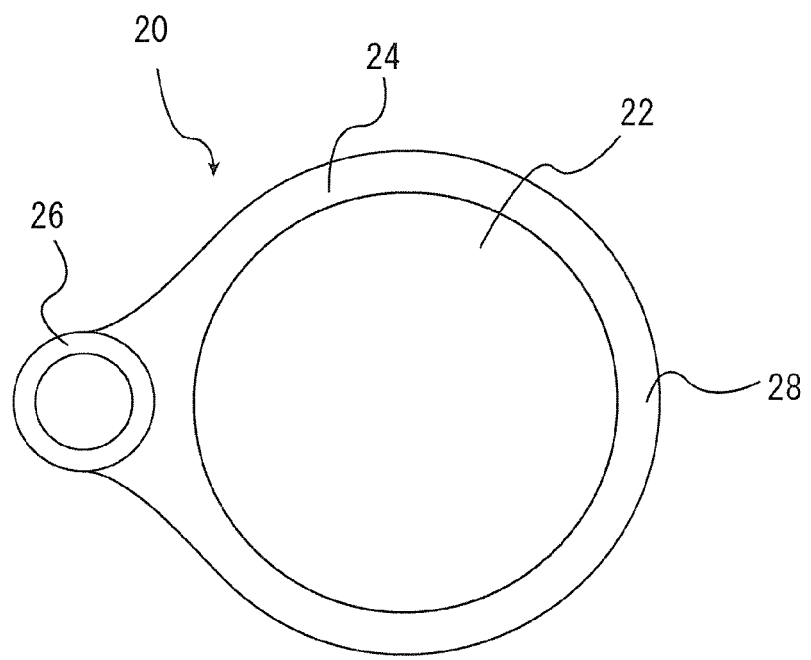
FIG. 2 is a planar diagram of the movable body included in the driving apparatus shown in FIG. 1.
Figure 3:
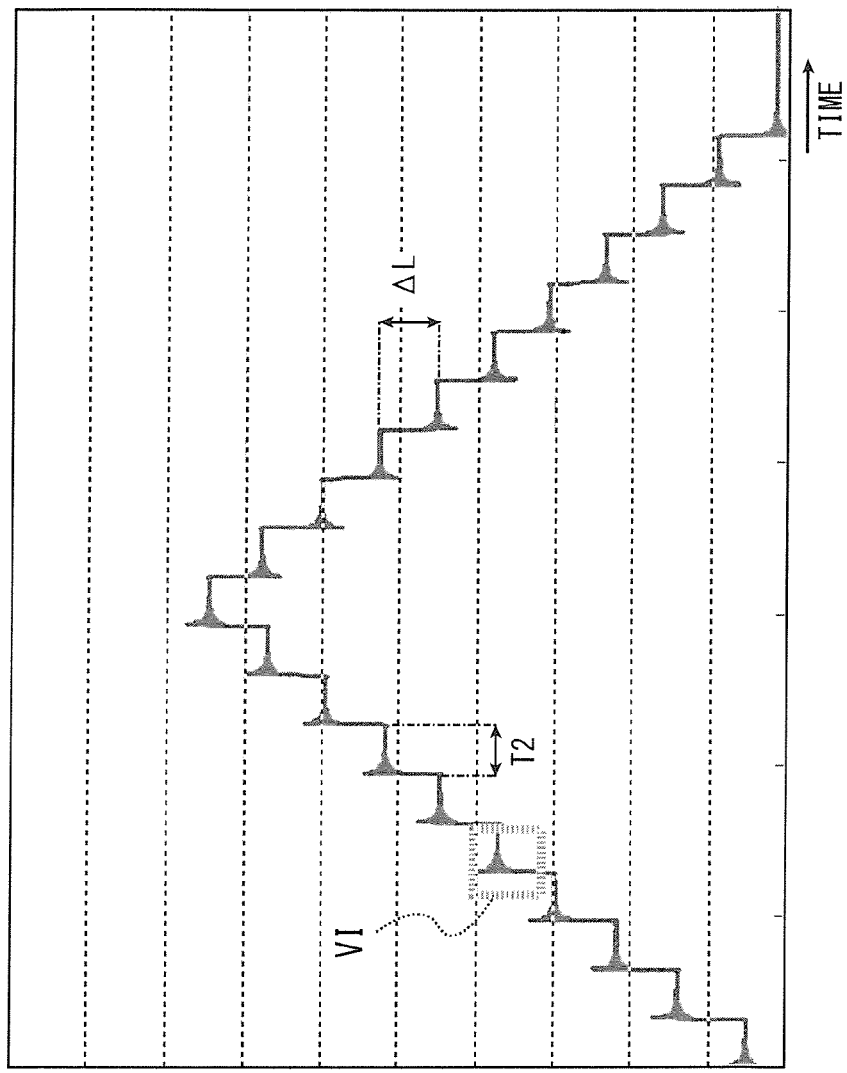
FIG. 3 is a graph showing one example of the movement of the movable body in the driving apparatus according the reference example.

FIG. 3 shows the movement of movable body 20 carried out during the auto focus movement in the driving apparatus according to the reference example which is only different for the driving signal from the embodiment of the present invention, but same for other constitutions. The vertical axis of FIG. 3 corresponds to the position at the second end portion 28 in the movable body 20 shown in FIG. 1 and FIG. 2, and the horizontal axis corresponds to the time. Note that, as shown in FIG. 1, the second end portion 28 of the movable body 20 is an end portion opposite to the engagement portion 26 along the second direction 52.

As shown in FIG. 3, during the auto focus operation, in the driving apparatus, the first driving signal is periodically applied to the piezoelectric element 12, and the movable body 20 is moved along the first direction 50 in step wise. Next, the second driving signal 49 is periodically applied to the piezoelectric element 12, and the movable body 20 move along the third direction 54 in step wise.

The period T2 of applying the first driving signal 42a and the second driving signal 49 is not particularly limited, and for example it can be 20 to 40 ms or so. Also, the amount of the movement ΔL of the movable body 20 in case of applying the first driving signal 42a or the second driving signal 49 once can be appropriately set depending on the constitution of the imaging device, and for example it can be 5 to 30 μm or so. Note that, while the movable body 20 is stopped at each position, the image element obtains the image signal, and the processing unit calculates the degree of focus based on the obtained image signal; thereby the imaging device can detect to which position the movable body 20 needs to be placed in order to focus.

Figure 4:
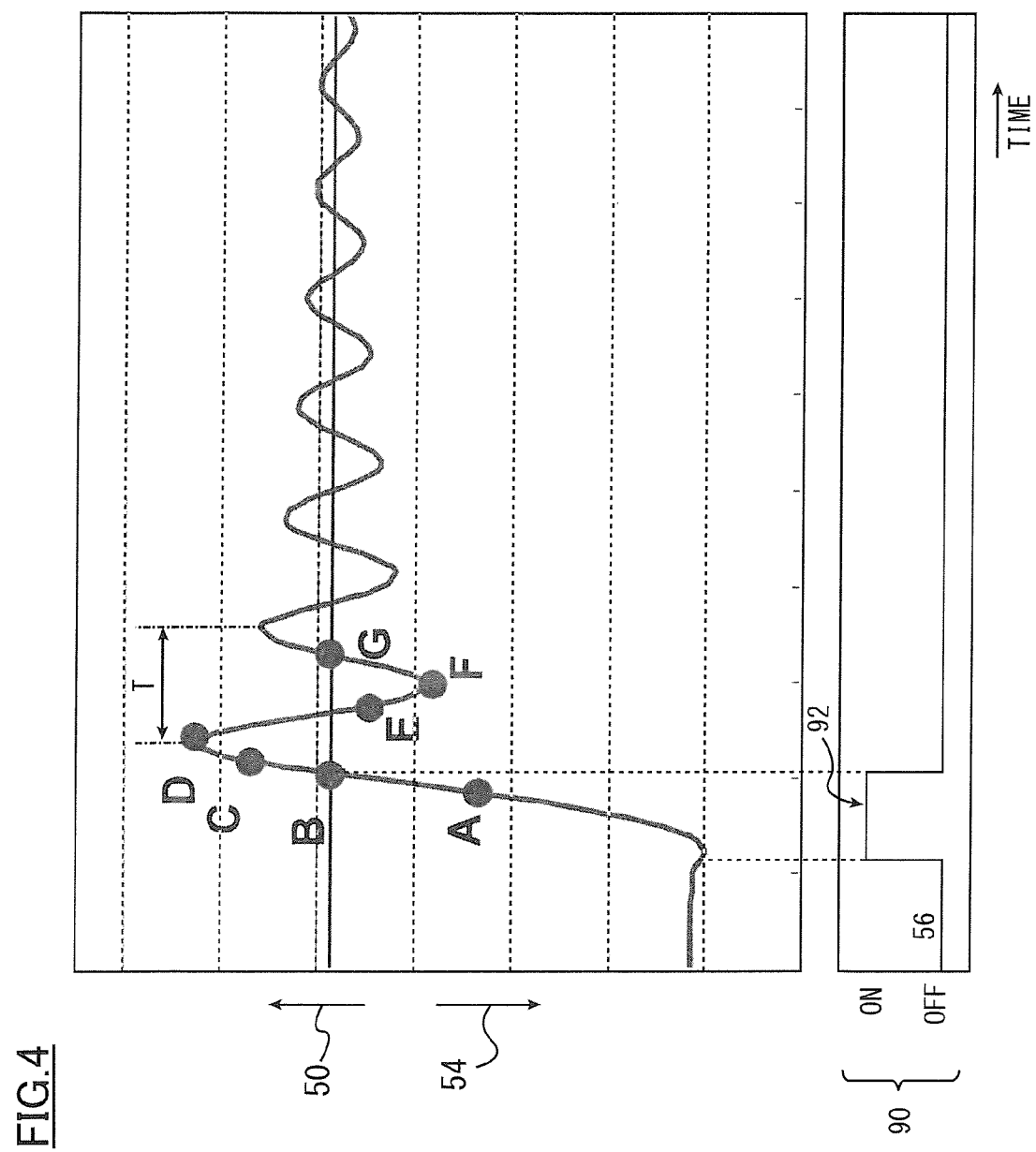
FIG. 4 is a partial enlargement of the graph shown in FIG. 3, and it is a conceptual diagram showing the time of application of the driving signal.

FIG. 4 is a partial enlargement of the graph of FIG. 3 (the upper part of FIG. 4) together with the time of the application of the driving signal 90 (the lower part of FIG. 4). The graph showing the movement of the second end portion 28 of the movable body 20 (the upper part of FIG. 4), and the graph showing the time change of the driving signal 90 (the lower part of FIG. 4) is shown by aligning the time (the horizontal axis). As shown in FIG. 4, in the driving apparatus according to the reference example, even after the first driving signal 92 is applied, the second end portion 28 of the movable body 20 is still vibrating.

Figure 9:
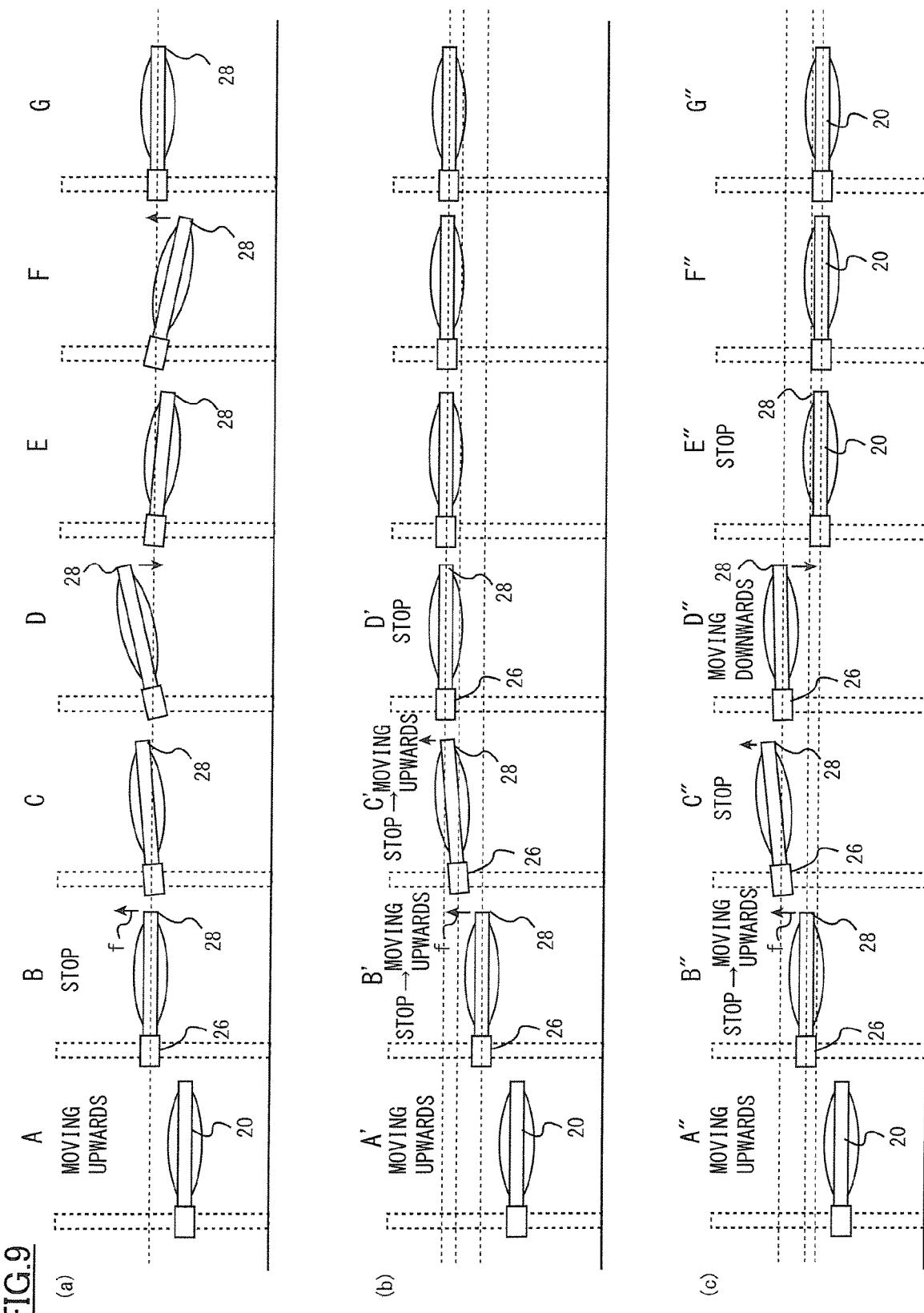
FIG. 9 is a conceptual diagram showing the position and posture of the movable body at each point of FIG. 4 to FIG. 6.

FIG. 9(a) schematically shows the position and the posture of movable body 20 at time A to G of FIG. 4. At the time A, as shown in FIG. 9(a)A, the application of the first signal 92 is maintained, and the movable body 20 is keep moving upwards (moving towards the first direction). At the time B, as shown in FIG. 9(a)B, the application of the first signal 92 is completed and the movable body 20 has stopped moving (the movement to the relative movement against the supporting shaft 14 has stopped). However, in the time B, the movable body 20 stops due to the friction force between the supporting shaft and the engagement portion 26, hence the inertia force towards the upper side (the first direction 50) is applied to the second end portion 28 which is the end portion of the opposite side of the engagement portion 26.

As shown in FIG. 9(a)B to FIG. 9(a)G, the force applied to the movable body 20 when it is stopped (time B) generates the vibration wherein the engagement portion 26 of the movable body 20 is the fixed end and the second end portion 28 is the free end. As shown in FIG. 4, the period T of the vibration generated to the movable body 20 when the movable body 20 is stopped can be measured by measuring the movement of the second end portion 28 of the movable body 20. The inventors of the present invention has found that there is a constant corresponding relation between the vibration period T and the generation of the operation noise or the frequency of the operation noise, and that such vibration of the movable body 20 is one of the cause of the operation noise of the driving apparatus.

Figure 5:
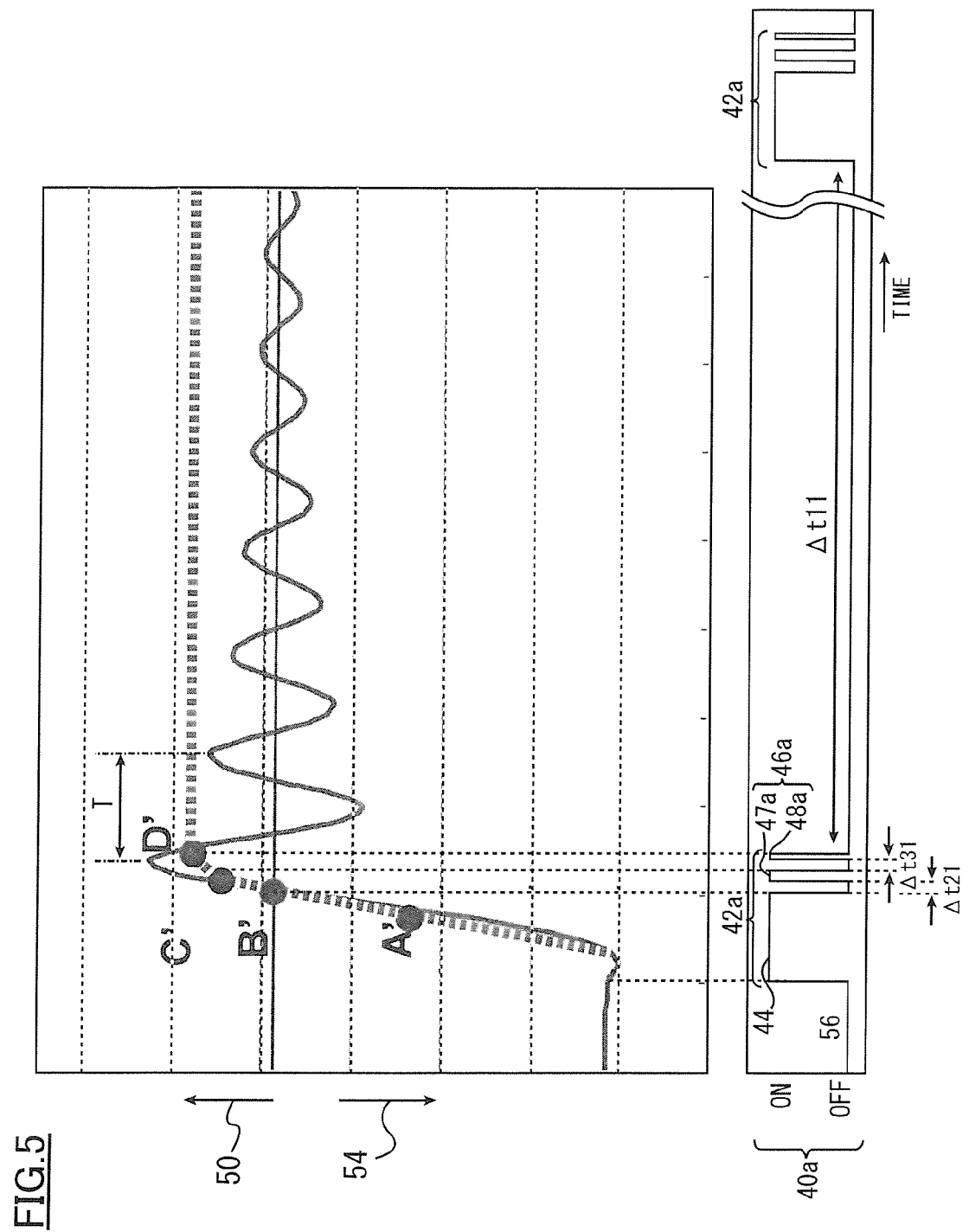
FIG. 5 is a conceptual diagram showing the movement of the movable body according to one embodiment of the present invention and the time of the application of the driving signal, compared with the movement of the movable body according to the reference example.

FIG. 5 is a graph showing the movement of the movable body 20 in the driving apparatus 10 according to the first embodiment of the present invention, and the time of applying the first driving signal 42a of the driving signal 40a, by comparing the movement of the movable body 20 in the reference example. Even in FIG. 5, the graph showing the movement of the second end portion 28 of the movable body 20 (the upper part of FIG. 5), and the time change of the driving signal 40a are shown by aligning the time (the horizontal axis).

The bold broken line of the upper part of FIG. 5 shows the movement of the second end portion of the movable body 20 in the vibrating device according to the first embodiment, and the plane line of the upper part of FIG. 5 is the movement of the second end portion 28 according to the reference example. Note that, as explained by using FIG. 3 and FIG. 4 regarding the reference example, FIG. 5 shows a part of the movement of the movable body 20 when the first driving signal 42a is periodically applied against the piezoelectric element 12.

As shown in the graph (lower part of FIG. 5) of the driving signal 40a, the first driving signal 42a is repeatedly applied by taking the first time Δt11 in between; thereby the movable body 20 moves along the first direction 50 in a step wise manner (refer to FIG. 3). As shown in FIG. 5, the first driving signal 42a is different from the first driving signal 92 according to the reference example (refer to FIG. 4), and it comprises not only the main driving waveform group 44 which moves the movable body 20 to the first direction 50, but also the sub driving waveform group 46a which is placed after the main driving waveform group 44.

Figure 6:
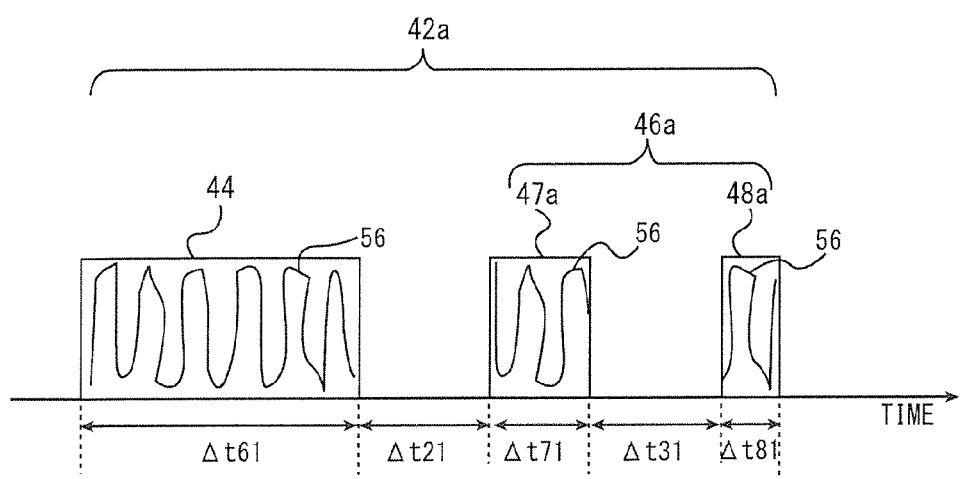
FIG. 6 is a conceptual diagram showing the detailed structure of the first driving signal used in the first embodiment.

FIG. 6 is a schematic diagram showing the first driving signal 42a shown in FIG. 5. The sub driving waveform group 46a of the first sub driving signal 42a is placed by taking the second rest time Δt21 in between the main driving waveform group. Also, the sub driving waveform group 46a comprises the first sub driving waveform group 47a placed by taking the second rest time Δt21 in between the main driving waveform group, and the second sub driving waveform group 48a placed by taking the third rest time Δt31 in between the first sub driving waveform group.

Also, in the first driving signal 42a, the waveform 56 and the frequency thereof included in the first sub driving waveform group 47a and the second sub driving waveform group 48a is the same as the waveform 56 and the frequency thereof included in the main driving waveform group 44. That is, the waveform 56 moves the movable body 20 (refer to FIG. 1) to the first direction 50, and for example the frequency is 100 to 200 kHz or so, and it is included in each driving waveform group 44, 47a, 48a. As such, by constituting the first driving signal 42a with the waveform 56 of one type, the driving portion 30 can be a simple constitution, and also the designing cost of the driving apparatus 10 can be suppressed. Note that, the waveform included in the first sub driving waveform group 47a and the second sub driving waveform 48a may be different from the waveform 56 included in the main driving waveform group 44, and as it will be explained in the second embodiment, it may be the waveform 58 (refer to FIG. 8) which moves the movable body 20 to the third direction 54.

The second rest time Δt21 inserted between the main driving waveform group 44 and the sub driving waveform group 46a (the first sub driving waveform group 47a) is preferably shorter than the first time Δt11 (FIG. 5), and from the point of suppressing the vibration of the movable body 20 when stopped, it is preferably shorter than vibration period T. Particularly, in case the first driving waveform group 47a includes the waveform which moves the movable body 20 to the same direction as the main driving waveform group, the second rest time Δt21 is preferably shorter than quarter of the vibration period T. Also, the minimum value of the second rest time Δt21 is not particularly limited, however for example the second rest time Δt21 can be a longer time than the one period of the applied period of the waveform 56. Also, the second rest time Δt21 is preferably one eighth or more of the vibration period T, from the point of securely temporarily stopping the movable body 20 after the application of the main driving waveform group 44 is completed.

The third rest time Δt31 inserted in between the first sub driving waveform group 47a and the second sub driving waveform group 48a is, as similar to the second rest time Δt21, shorter than the first time Δt11 (refer to FIG. 5), and preferably shorter than the vibration period T. Particularly, in case the second sub driving waveform group 48a includes the waveform which moves the movable body 20 to the same direction (the first direction 50) as the first sub driving waveform group 47a, the third rest time Δt31 is preferably shorter than quarter of the vibration period T. Also, the minimum value of the third rest time Δt31 is not particularly limited as long as it is longer than the application period of the waveform 56, as similar to the second rest time Δt21.

The first sub driving waveform group 47a and the second sub driving waveform group 48a is applied in order to suppress the vibration when the movable body 20 is stopped; hence the application time Δt71 of the first sub driving waveform group 47a and the application time Δt81 of the second sub driving waveform group 48a is preferably shorter than the application time Δt61 of the main driving waveform group 44. Also, in order to stop the vibration as soon as possible, the time from the beginning and to the end of the sub driving waveform group 46a (Δt71+Δt31+Δt81) is preferably shorter than the application time Δt61 of the main driving waveform group 44.

FIG. 9(b) shows the schematic position and the posture of the movable body 20 at the time A' to D' in FIG. 5. As shown in FIG. 9(b)A' and FIG. 9(b)B', the movable body 20 rises (move towards the first direction 50) while the main driving waveform 44 of the first driving signal 42a (the time A'), then stops when the application of the main driving waveform group 44 is completed (the time B'). Then, as shown by FIG. 5, FIG. 9(b)B' and FIG. 9(b)C', the vibration of the movable body 20 starts and the second end portion 28 begins to vibrate towards the upper side (to the first direction 50).

In the driving by the first driving signal 42a, as shown by FIG. 9(b)B' to FIG. 9(b)C', while the second end portion 28 is vibrating towards upper side, the first sub driving waveform group 47a which rises the movable body 20 is applied, and the engagement portion 26 of the movable body 20 moves. By rising the engagement portion 26, the force that vibrates the movable body 20 is released; hence the vibration of the movable body is suppressed.

Further, for the driving by the first driving signal 42a, the second sub driving waveform group 48a is applied after the third rest time Δt31 of being completed with the application of the first sub driving waveform group 47a. As shown by FIG. 9(b)C', even when the application of the first sub driving waveform group 47a is stopped (the time C'), in some case the force which moves the movable body 20 remains. In such case, when the engagement portion 26 of the movable body 20 is stopped (the time C'), the second end portion 28 again vibrates towards the upper side.

However, as shown by FIG. 9(b)C' to FIG. 9(b)D', when the second end portion 28 vibrates towards the upper side again, the second sub driving waveform group 48a which moves the movable 20 upwards is applied; thereby the engagement portion 26 of the movable body 20 moves towards the upper side, and the force which vibrates the movable body 20 is released. As such, for the driving by the first driving signal 42a, the force vibrating the movable body 20 is released by the application of the sub waveform group 46a; hence when the first driving signal 42a is stopped from applying, the vibration caused to the movable body 20 is effectively suppressed.

As shown by FIG. 5 and FIG. 6, in case the second rest time Δt21 inserted between the main driving waveform group 44 and the first sub driving waveform group 47a includes the waveform 56 of which the main driving waveform group 44 and the first sub waveform group 47a moves the movable body 20 to the same direction; then it is preferably shorter than quarter of vibration period T. By applying the first sub driving waveform group 47a which moves the movable body 20 to the same direction as the main driving waveform group 44 in between the time range of after the application of the main driving waveform group 44 is completed and till the quarter of the vibration period passes; the force which vibrates the movable body 20 can be effectively released.

Also, in regards with the third rest time Δt31 31 inserted between the first sub driving waveform group 47a and the second sub driving waveform group 48b, from the same reason as the second rest time Δt21, in case the first sub driving waveform group 47a and the second sub driving waveform group 48a includes the waveform 56 of which the first sub driving waveform group 47a and the second sub driving waveform group 48a moves the movable body 20 is preferably shorter than the quarter of the vibration period T.

FIG. 10 shows the comparison of the measurement of the movement of the second end portion 28, in case of driving the movable body 20 by the first driving signal according to the reference example, and in case of moving the movable body 20 by the first driving signal 92 according to the example of the first embodiment. The bold line of FIG. 10 shows the movement of the second end portion 28 in the reference example, and the thinner line of FIG. 10 shows the movement of the second end portion 28 in the example.

The application time of the first driving signal 92 according to the reference used in the measurement result is 1.05 ms (refer to lower part of FIG. 4); the application time Δt61 of the main driving signal group 44 in the first driving signal 42a according to the example is 0.84 ms; the application time Δt71 of the first sub driving signal waveform group is 0.14 ms; the application time Δt81 of the second sub driving waveform group is 0.07 ms; the first time Δt11 is 32.86 ms; and the second rest time Δt21 and the third rest time Δt31 is 0.15 ms (refer to lower part of FIG. 5 and FIG. 6). Note that, in the first driving signal 92 according to the reference example, the main driving waveform group 44 according to the example, the first sub driving waveform group 47a and the second sub driving waveform group 48a includes, common waveform and common frequency (143 kH).

As shown by FIG. 10, in case the first driving signal 92 according to the reference example is applied, even after the application of the first driving signal 92 is completed and the upwards movement of the movable body 20 is completed; the second end portion 28 is still moving and the movable body 20 is vibrating. The vibration period T of the movable body 20 being measured is 1.2 ms (833 Hz), and the operation noise is confirmed.

On the other hand, in case the first driving signal 42a according to the example is applied, the second end portion 28 is barely moving, and the vibration of the movable body 20 is suppressed after the application of the first driving signal 42a is completed and that the upwards movement of the movable body 20 is completed. Also, in the example, the operation noise accompanying the vibration of the movable body 20 was not confirmed.

As such, the driving apparatus 10 applying the driving signal 40a to the piezoelectric element 12 as shown by FIG. 5 and FIG. 6, the vibration caused to the movable body when it is stopped is suppressed, and the operation noise caused by the vibration of the movable body 20 can be effectively suppressed. Also, the driving apparatus 10 suppresses the vibration caused to the movable body 20 when stopped, thereby the blurring of the image by the light passing through the optical system 22 can be reduced; hence it is advantageous to enhance the accuracy and the speed of the auto focus in the imaging device mounting these.

The Second Embodiment

Figure 7:
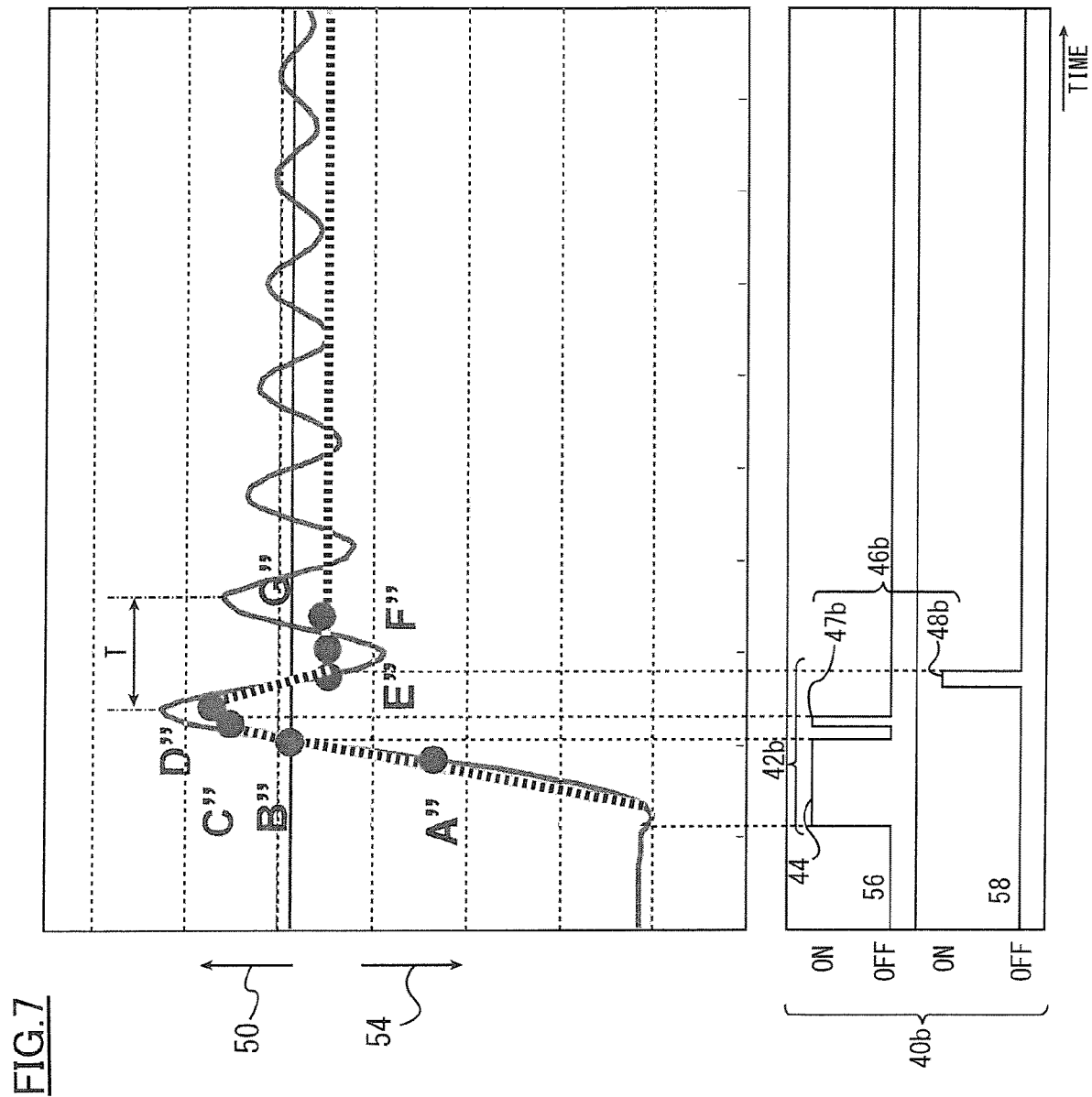
FIG. 7 is a conceptual diagram showing the movement of the movable body of the second embodiment of the present invention and the time of application of the driving signal compared with the movement of the movable body according to the reference example.

FIG. 7 is a graph showing the movement of the movable body 20 in the reference example comparing the movement of the movable body 20 in the vibrating apparatus according to the second embodiment of the present invention and the time of applying the first driving signal 42b of the driving signal 40b. In FIG. 7, as similar to FIG. 4 and FIG. 5, the graph showing the movement of the second end portion 28 of the movable body 20 (the upper part of FIG. 6) and the graph showing the time change of the driving signal 40b is shown by aligning the time (the horizontal axis).

The bold line of the upper part of FIG. 7 show the movement of the second end portion 28 of the movable body in the vibrating device according to the second embodiment, and the plane line of the upper part of FIG. 7 show the movement of the second end portion 28 according to the reference example. The driving apparatus according to the second embodiment is as same as the driving apparatus of the first embodiment except that the driving signal 40b has a different driving signal 40a from the first embodiment; thus the explanation of the overlapping part will be omitted.

Even for the driving signal 40b of the second embodiment, the first driving signal 42b is repeatedly applied to the piezoelectric element 12 by taking the first time in between, as similar to the driving signal 40a of the first embodiment; thereby the movable body 20 moves along the first direction in step wise (refer to FIG. 3). The first driving signal 42b shown in FIG. 7 shares a common points such as comprising not only the main driving waveform group 44 but also the sub driving waveform group 46b, and also that the sub driving waveform group 46b includes the first driving waveform group 47b and the second sub driving waveform group 48b.

However, the first driving signal 42b shown in FIG. 7 differs from the first driving signal 42a as the second sub driving waveform group 48b includes the waveform 58 which moves the movable body 20 to the third direction 54 (refer to FIG. 1). That is, in the first driving signal 42b, the main driving waveform group 44 and the first sub driving waveform group 47b includes the waveform 56 which moves the movable body 20 to the first direction 40; on the other hand, the second sub driving waveform group 48b includes the waveform 58 which moves the movable body 20 to the opposite direction of the main driving waveform group 44 and the first sub driving waveform group 47b.

Figure 8:
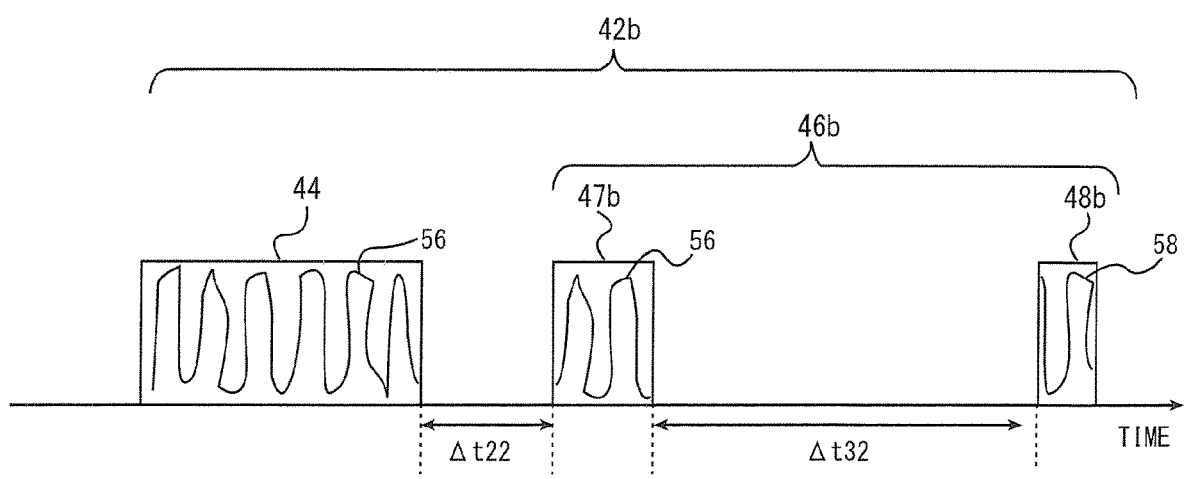
FIG. 8 is a conceptual diagram showing the detailed structure of the first driving signal used in the second embodiment.

FIG. 8 schematically show the first driving signal 42b shown in FIG. 6. The sub driving waveform group 46b of the first driving signal 42b is placed by taking the second rest time Δt22 in between the main driving waveform group 44. Also, the sub driving waveform group 46b has the first sub driving waveform group 47b placed by taking the second rest time Δt33 in between the main driving waveform group, and the second sub driving waveform group 48a placed by taking the third rest time Δt32 in between the first sub driving waveform group 47b.

In regards with the waveform 56 included in the main driving waveform group 44 and the first sub driving waveform group 47b, it is the same as the waveform 56 included in the first driving signal 42b of the first embodiment. The waveform 58 included in the second sub driving waveform group 48b is not particularly limited as long as it moves the movable body 20 to the third direction 54 which is the opposite direction of the first direction 50; and for example it can be the same waveform included in the second driving signal 49 (particularly the main driving waveform group thereof) generated by the second driving portion 34 shown in FIG. 1.

FIG. 9(c) schematically show the position and the posture of the movable body 20 at the time A" to G" in FIG. 7. The first driving signal 42b is as same as the first driving signal 42a of the first embodiment in regards with the main driving waveform group 44 and the first sub driving waveform group; thus the time A" (FIG. 9(c)A") to the time C" (FIG. 9(c)C") is as same as the time A' (FIG. 9(b)A') to the time C' (FIG. 9(b)C').

For the driving by the first driving signal 42b shown in FIG. 7, as shown in the time C" to time E" of FIG. 5, the second sub driving waveform group 48b is applied after the third rest time Δt32 is passed being completed with the application of the first sub driving waveform 47b. Here, the third rest time Δt32 in the first driving signal 42b is longer than the third rest time Δt31 of the first embodiment, and when the second end portion 28 of the movable body 20 has completed the vibration to the upper side and while vibrating towards the lower side, the second sub driving waveform group 48b is applied.

As shown in FIG. 9(c)D" to FIG. 9(c)E", when the second end portion 28 is vibrating towards the lower side, the second sub driving waveform group 48b which moves the movable body 20 downwards (move the third direction 54) is applied, thereby the engagement 26 of the movable body 20 moves to the lower side and the force vibrating the movable body 20 is released. As such, even for the driving by the first driving signal 42b, as similar to the driving by the first driving signal 42a of the first embodiment, the force of vibrating the movable body 20 can be released by applying the sub driving waveform group 46b; hence the vibration to the movable body 20 caused when the first driving signal 42b is completed from applying is effectively suppressed.

As shown in FIG. 7 and FIG. 8, the third rest time Δt32 inserted between the first sub driving waveform group 47b and the second sub driving waveform group 48b is preferably longer than the quarter of the vibration period T and shorter than the three quarter of the vibration period T, in case the second sub driving waveform group 48b includes the waveform 58 which moves the movable body 20 to the opposite direction of the first sub driving waveform group 47a. By applying the second sub driving waveform group 48b which moves the movable body 20 to the opposite direction of the main driving waveform group 44, in between the time range after the quarter of the vibration period is passed being completed with the application of the main driving waveform group 44 till the three quarter of the vibration period is passed; then the force of vibrating the movable body 20 can be effectively released.

Other Embodiment

In the above mentioned embodiment, the first driving signal 42a and 42b moving the movable body 20 was explained as an example, however in case of carrying out the auto focus operation as shown in FIG. 3, the second driving signal 49 which moves the movable body 20 to the third direction 54 can be the same as the first driving signal 42a and 42b. That is, the driving portion 30 generates the second driving signal 49 comprising the main driving waveform group 44a and the sub driving waveform group 46a, as shown in FIG. 6 and FIG. 8, and by applying these to the piezoelectric element, the movement of the movable body 20 with little vibration and operation noise can be accomplished.

Also, in the first driving signal 42b according to the second embodiment, the second sub driving waveform group 48b includes the waveform 58 which moves the movable body 20 to the opposite direction of the main driving waveform group 33, however on the contrary to this, the first sub driving waveform group 47b may include the waveform 58 which moves the movable body 20 to the opposite direction of the main driving waveform group 44. Note that, in such case, the second rest time Δt21 and Δt22 inserted between the main driving waveform group 44 and the sub driving waveform group 46b (the first sub waveform group 47b), is preferably longer than the quarter of the vibration period T and shorter than three quarter of the vibration period T.

NUMERICAL REFERENCES

10 . . . Driving apparatus
12 . . . Piezoelectric element
14 . . . Supporting shaft
16 . . . Weight
20 . . . Movable body
22 . . . Optical system
24 . . . Holding frame
26 . . . Engagement portion
28 . . . Second end portion
30 . . . Driving portion
40a, 40b, 90 . . . Driving signal
42a, 42b, 92 . . . First driving signal
56, 58 . . . Waveform
44 . . . Main driving waveform group
46a, 46b . . . Sub driving waveform group
47a, 47b . . . First sub driving waveform group
48a, 48b . . . Second sub driving waveform group
49 . . . Second driving signal
50 . . . First direction
52 . . . Second direction
54 . . . Third direction
Δt11 . . . First time
Δt21, Δt22 . . . Second rest time
Δt31, Δt32 . . . Third rest time
Δt61, Δt71, Δt81 . . . Application time
L . . . Moved amount
T . . . Vibration period

What is claimed is:

1. A method of driving a driving apparatus, comprising:
expanding and contracting a piezoelectric element in accordance with a driving signal;
connecting a supporting shaft to said piezoelectric element;
frictionally engaging a movable body with said supporting shaft, the movable body being capable of moving along said supporting shaft; and
moving said movable body in a first direction towards said piezoelectric element by applying said driving signal including a first driving signal against said piezoelectric element, wherein said applying further comprises repeatedly applying said first driving signal against said piezoelectric element by taking a first rest time in between each repetition of said first driving signal, and
wherein said first driving signal comprises a main driving waveform group and a sub driving waveform group which is placed after said main driving waveform group by having a second rest time shorter than said first rest time in between said main driving waveform group and said sub driving waveform group.

2. The method of driving said driving apparatus as set forth in claim 1, wherein said movable body has an engagement portion formed at one end part of a second direction which is approximately perpendicular to said first direction, and frictionally engaging with said supporting shaft, and
wherein said movable body has one ended supporting structure supported by said supporting shaft via said engagement portion.

3. The method of driving said driving apparatus as set forth in claim 1, wherein said sub driving waveform group includes a waveform, the method further comprising:
moving said movable body in said first direction by applying said waveform against said piezoelectric element, and
when a vibration period T is caused in said movable body while said movable body is stopped, then said second rest time is shorter than T/4.

4. The method of driving said driving apparatus as set forth in claim 1, wherein said sub driving waveform group includes a waveform, the method further comprising:
moving said movable body in an opposite direction against said first direction by applying said waveform against said piezoelectric element, and
when a vibration period T is caused in said movable body while said movable body is stopped, then said second rest time is longer than T/4 and shorter than 3T/4.

5. The method of driving said driving apparatus as set forth in claim 1, wherein said sub driving waveform group has a first sub driving waveform group which is placed after said main driving waveform group by having said second rest time in between said main driving waveform group and said first sub driving waveform group, and
a second sub driving waveform group which is placed after said first sub driving waveform group by having a third rest time shorter than said first time in between said first sub driving waveform group and said second sub driving waveform group.

6. The method of driving said driving apparatus as set forth in claim 5, wherein said second sub driving waveform group includes a waveform, the method further comprising:
moving said movable body in a same direction that said first sub driving waveform group moves said movable body by applying said waveform against said piezoelectric element, and
when a vibration period T is caused in said movable body while said movable body is stopped, then said third rest time is shorter than T/4.

7. The method of driving said driving apparatus as set forth in claim 5, wherein said second sub driving waveform group includes a waveform, the method further comprising:
moving said movable body in an opposite direction than said first sub driving waveform group moves said moveable body by applying said waveform against said piezoelectric element, and
when a vibration period T is caused in said movable body while said movable body is stopped, then said third rest time is longer than T/4 and shorter than 3T/4.

8. A method of driving a driving apparatus, comprising:
expanding and contracting a piezoelectric element in accordance with a driving signal;
connecting a supporting shaft to said piezoelectric element;
frictionally engaging a movable body with said supporting shaft, said movable body being capable of moving along said supporting shaft; and
moving said movable body in a first direction towards said piezoelectric element by applying said driving signal including a first driving signal against said piezoelectric element, wherein said applying further comprises repeatedly applying said first driving signal against said piezoelectric element by taking a first rest time in between each repetition of said first driving signal,
wherein said first driving signal comprises a main driving waveform group and a sub driving waveform group which is placed after said main driving waveform group by having a second rest time shorter than said first rest time in between said main driving waveform group and said sub driving waveform group,
wherein said sub driving waveform group includes a waveform which moves said movable body in said first direction, and when a vibration period T is caused in said movable body while said movable body is stopped, then said second rest time is shorter than T/4,
wherein said sub driving waveform group has a first sub driving waveform group which is placed after said main driving waveform group by having said second rest time in between said main driving waveform group and said first sub driving waveform group, and
a second sub driving waveform group is placed after said first sub driving waveform group by having a third rest time shorter than said first rest time in between said first sub driving waveform group and said second sub driving waveform group.

9. The method of driving said driving apparatus as set forth in claim 8, wherein said second sub driving waveform group includes a waveform, the method further comprising:
moving said movable body in a same direction that said first sub driving waveform group moves said movable body by applying said waveform against said piezoelectric element, and
when said vibration period T is caused in said movable body while said movable body is stopped, then said third rest time is shorter than T/4.

10. The method of driving said driving apparatus as set forth in claim 9, wherein said second sub driving waveform group includes a waveform, the method further comprising:
moving said movable body moves in an opposite direction than said first sub driving waveform group moves said movable body by applying said waveform against said piezoelectric element, and when said vibration period T is caused in said movable body while said movable body is stopped, then said third rest time is longer than T/4 and shorter than 3T/4.

11. A method of driving a driving apparatus, comprising;
expanding and contracting a piezoelectric element in accordance with a driving signal;
connecting a supporting shaft to said piezoelectric element;
frictionally engaging a movable body with said supporting shaft, the movable body being capable of moving along said supporting shaft; and
moving said movable body in a first direction towards said piezoelectric element by applying said driving signal including a first driving signal against said piezoelectric element, wherein said applying further comprises repeatedly applying said first driving signal against said piezoelectric element by taking a first rest time in between each repetition of said first driving signal,
wherein said first driving signal comprises a main driving waveform group and a sub driving waveform group which is placed after said main driving waveform group by having a second rest time shorter than said first rest time in between said main driving waveform group and said sub driving waveform group,
wherein said sub driving waveform group includes a waveform which moves said movable body in an opposite direction against said first direction,
when a vibration period T is caused in said movable body while said movable body is stopped, then said second rest time is longer than T/4 and shorter than 3T/4,
wherein said sub driving waveform group has a first sub driving waveform group which is placed after said main driving waveform group by having said second rest time in between said main driving waveform group and said first sub driving waveform group, and
a second sub driving waveform group which is placed after said first sub driving waveform group by having a third rest time shorter than said first rest time in between said first sub driving waveform group and said second sub driving waveform group.

12. The method of driving said driving apparatus as set forth in claim 11, wherein said second sub driving waveform group includes a waveform, the method further comprising:
moving said movable body in a same direction that said first sub driving waveform group moves said movable body by applying said waveform against said piezoelectric element, and
when said vibration period T is caused in said movable body while said movable body is stopped, then said third rest time is shorter than T/4.

13. The method of driving said driving apparatus as set forth in claim 11, wherein said second sub driving waveform group includes a waveform, the method further comprising:
moving said movable body in an opposite direction than said first sub driving waveform group moves said moveable body by applying said waveform against said piezoelectric element, and
when said vibration period T is caused in said movable body while said movable body is stopped, then said third rest time is longer than T/4 and shorter than 3T/4.

* * * * *